United States Patent [19]

Amans et al.

[11] Patent Number: 5,265,012

[45] Date of Patent: Nov. 23, 1993

[54] METHOD TO DETERMINE A SPACE FROM A KNOWN DISCRETE SPACE FOR THE RECONSTRUCTION OF BIDIMENSIONAL OR TRIDIMENSIONAL IMAGES, AS WELL AS A DEVICE TO IMPLEMENT AND APPLY THE METHOD

[75] Inventors: Jean-Louis Amans; Christophe Caquineau, both of Grenoble, France

[73] Assignee: Commissariat a l'Energie Atomique, Paris, France

[21] Appl. No.: 534,748

[22] Filed: Jun. 7, 1990

[30] Foreign Application Priority Data

Jun. 12, 1989 [FR] France ................... 89 07728

[51] Int. Cl.$^5$ .............................................. G06F 15/00
[52] U.S. Cl. ........................... 364/413.13; 364/413.19
[58] Field of Search ................... 364/413.13, 413.16, 364/413.21, 413.19

[56] References Cited

U.S. PATENT DOCUMENTS 4,812,983  3/1989  Gullberg et al. ............... 364/413.21
5,053,958  10/1991  Tam ................................ 364/413.13

FOREIGN PATENT DOCUMENTS 107253  5/1984  European Pat. Off. .

Primary Examiner—Roy N. Envall, Jr.
Assistant Examiner—Xuong Chung
Attorney, Agent, or Firm—Michael N. Meller

[57] ABSTRACT

The invention concerns a method and a device to determine a space from a known discrete space for the reconstruction of bidimensional or tridimensional images. In order to achieve this, the method comprises an iterative elementary phase whose aim is to determine the contribution to the value of an element of the unknown space on the basis of the value of the element (and possibly from its vicinity) of the known space by controlling the following successive stages: for predetermining parameters (V1 to V4); for the index determining one point of the known space by a generalized relation including the main acquisition devices V1+eV2/V3+eV4; for determining contributions by interpolation on adjacent points; for weighting contributions, and for adding the weighted contribution to the value of the element of the unknown space during processing.

Application for medical optical image formation and for non-destructive industrial controls.

17 Claims, 9 Drawing Sheets

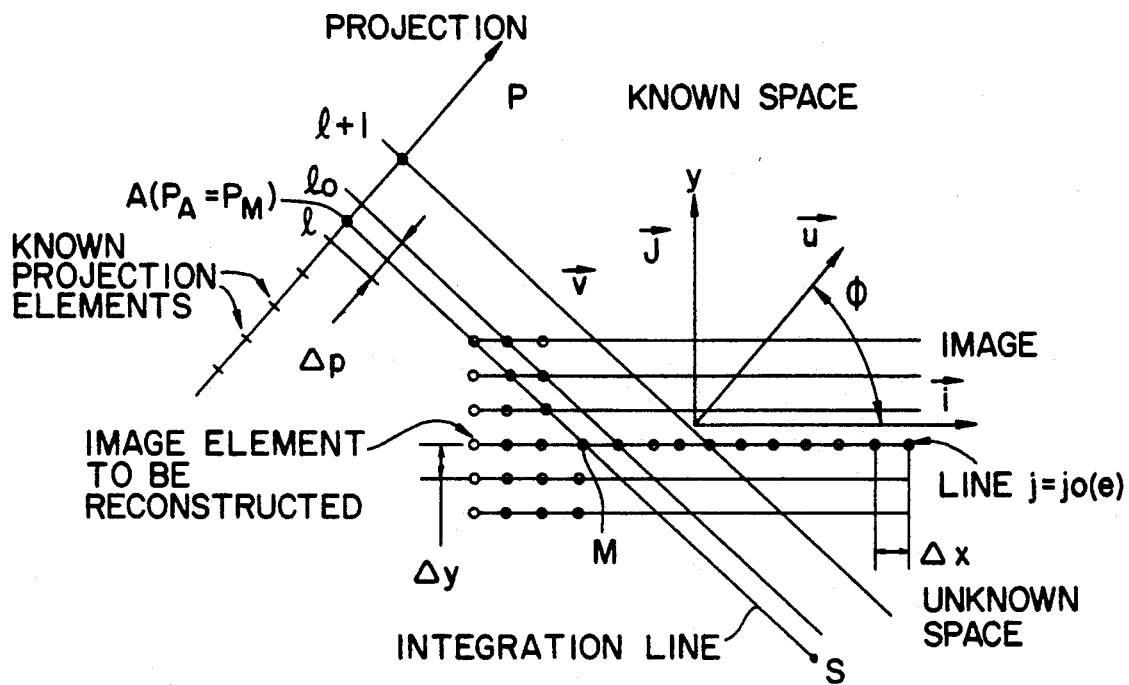
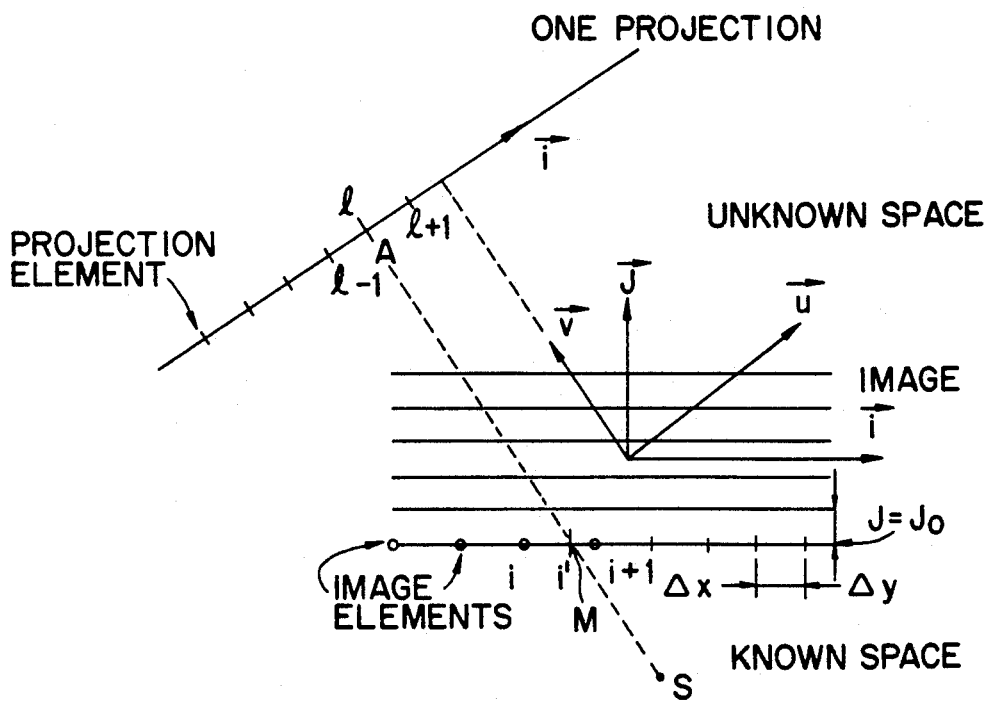

BIDIMENSIONAL PROJECTION

TRIDIMENSIONAL VOLUME

COLUMN CI TO BE RECONSTRUCTED
DEFINED BY jo AND Ko

PROJECTION SPACE WITH COORDINATES p,q,φ

VOLUME SPACE X,Y,Z

RADON SPACE p,θ,φ

REARRANGED PROJECTION SPACE

UNKNOWN SPACE
(X-RAY PROJECTION)

KNOWN SPACE
(X-RAY)

RADON VOLUME
$A\varphi = \varphi \text{(mo)}$

UNKNOWN SPACE
$A\varphi = \varphi \text{(mo)}$

PLANE OF REARRANGED
PROJECTIONS

UNKNOWN SPACE
(VOLUME PLANE)

METHOD TO DETERMINE A SPACE FROM A KNOWN DISCRETE SPACE FOR THE RECONSTRUCTION OF BIDIMENSIONAL OR TRIDIMENSIONAL IMAGES, AS WELL AS A DEVICE TO IMPLEMENT AND APPLY THE METHOD

FIELD OF THE INVENTION

The object of the present invention is to provide a method to determine a space from a known discrete space for the reconstruction of bidimensional or tridimensional images, as well as to provide a device to implement and apply the method.

BACKGROUND OF THE INVENTION

In certain applications, such as medical optical image formation applications making it possible to restore images of the human body or industrial optical image formation for the non-destructive control of parts, recourse is made to image reconstruction techniques.

These image reconstructions are made from projections obtained by a transmitting acquisition device and capturing an irradiation radiation. These projections are obtained following a series of measurements for measuring the attenuation of the radiation through the object to be controlled, the incidence of the radiation having been modified between each series of measurements.

The acquisition devices are constituted by an X or $\gamma$ radiations source or neutrons source. They also comprise one or several detectors.

When there is only one detector, the source moves linearly and transmits at each movement so as to obtain a projection from a series of measurements; the geometry of the acquisition device is called parallel.

When there is a bar of detectors, the source is fixed, the measurement series is obtained from a single transmission and the acquisition geometry is called fan-shaped.

In the presence of a matrix of detectors, the geometry is known as conical.

Generally speaking, the objective is to have a large number of projections so as to obtain the best possible restoration of images of the object thus traversed by the radiation. In order to achieve this, the source is made to turn by small increments of angles around the object so as to obtain series of measurments under different incidences.

Generally speaking, the reconstruction of images (bidimensional images) from projections calls upon two major categories of methods:
the category of analytic methods,
the category of algebraic methods.

The analysis of these analytic and algebraic methods shows that, apart from filtering, rearrangement, masking operations, etc., the basic operations are reprojection and retroprojection.

Reproduction (or projection) is an operation which,
from an image or volume, makes it possible to obtain the projections relating to these spaces within a given geometry.

In the case of the optical image formation x, each point of the projection corresponds to an estimate of the energy attenuation of a beam of X-rays on a linear path in space regarded as supposed to be known.

This reprojection operation is especially used in iterative techniques (algebraic method) and in certain volume reconstruction methods by synthesis and inversion of the RADON transform.

It is possible to refer to the thesis of P. Grangeat held at the Ecole Nationale Supérieure des Télécommunications and dated Jun. 30, 1987 and entitled "Analysis of a 3D optical image formation system by reconstruction from conical geometry X-rays". Reference may also be made to the patent application FR8707134 published under the No 2615619.

Retroprojection (or spreading) is the dual processing of reprojection. It consists of redistributing the information derived from projections to the image pixels (or to volume voxels) belonging to an acquisition straight line.

This operation is used in all reconstruction (images or volumes) methods from projections. As part especially of analytic methods, it is sometimes associated with data rearrangement and filtering operations.

These two operations (reprojection and retroprojection) are strictly linked with the geometry of the acquisition system which has generated the initial data. This geometry, as said earlier, may be:
parallel,
fan-shaped (constant linear pitch or constant angular pitch)
conical (3-D).

The data volume to be processed and the complexity of reconstruction methods thus constitute a problem requiring the use of high-performing processing means.

The most natural solution, which consists of using non-dedicated (standard) vectorial processors to implement these methods, results in having a high price/performance ratio. This solution provides a certain amount of flexibility (as they are frequently programmable in an evolved language), but this occurs to the detriment of price and performance.

In addition, these currently exists a certain number of specific machines. Specific bidimensional retroprojection processors have been produced as part of tomographic systems. For example, the STAR Technology company distributes a retroprojector (fan-shaped geometry) associated with a vectorial processor.

By virtue of their conception, all products currently existing on the market are linked to an acquisition geometry and as a result have not been designed to allow for the efficient implementation of reprojection and retroprojection operations as regards the various geometries.

It is to be noted that the methods making it possible to carry out reprojections and retroprojections are characterized by a set of imbricated iterative phases: phase concerning the projections—phase solely concerning image planes in 3D cases—phase concerning image-lines—phase concerning the elements of the line—and the phase concerning the projections may be imbricated anywhere prior to the element phase.

The lowest level phase concerns the correspondence of the line elements and is qualified as an elementary phase. This phase places in correspondence two monodimensional units (which can be assimilated to lines), one of which is known. The operations incident to this phase make it possible to calculate a contribution to each element of the unknown monodimensional unit. This phase is repeated by about $N^3$ (respectively about $N^4$ times) at the time of reconstructuring an image of size $N^2$ (respectively with a size volume $N^3$) from N projections.

SUMMARY OF THE INVENTION

The present invention consists of a method and a device to determine a space from a discrete known space for the reconstruction of an image or volume making it possible to overcome the drawbacks inherent in the usual devices and methods used for image reconstructions.

In effect, the method of the invention is able to be used, regardless of the geometry of the acquisition device, whether it be 2D parallel, 3D, 2D fan-shaped or 3D conical. The device to implement the method has been conceived so as to be used irrespective of the acquisition device, unlike the case in the prior Art.

The object of the present invention is to provide a method to determine a space from a discrete known space by means of reprojection or retroprojection for the reconstruction of a bidimensional or tridimensional image of a body to be analysed from an obtained set of projections by means of a defined geometry acquisition device comprising a radiation source and a set of detectors, one of the spaces being defined by a set of elementary points respectively marked along three axes by indices or letters (l, m, n) corresponding to the coordinates along these axes, the other space being defined by a set of elementary points, also respectively marked by the indices (i, j, k) along three axes of this space, these indices (i, j, k) corresponding to the coordinates of these axes, the determination of the unknown space being obtained by calculating the numerical value of each point of the unknown space on the basis of determination of the contributions brought by the numerical values of the corresponding points of the known space, this method being characterized in that it comprises an elementary phase consisting of iteratively determining for each point a monodimensional set of points of the unknown space, said points being borne by a given axis E of this space, the contribution brought by the corresponding point and possibly by the adjacent points of a monodimensional set of points of the known space, these points being borne by an axis F of this space, this phase iteratively comprising for each point the following stages:

determining the index letter associated with the coordinate on the axis F of the corresponding point of the known space by taking the entire part ADR of the generalized expression $a_0(e)$ with $$a_0(e) = \frac{V1 + eV2}{V3 + eV4}$$

e being the iteration index letter corresponding to the coordinate on the axis E of the point in question of the unknown space and V1, V2, V3 and V4 being constant parameters in the elementary phase, all these parameters being determined prior to this phase according to the selected acquisition geometry; and according to the type of operation (reprojection or retroprojection) carried out and the monodimensional units in question, determining the contribution C to be given to the numerical value of the point in question of the unknown space.by interpolation on the numerical values of the corresponding ADR index point and possibly of adjacent points, weighting this contribution by a factor f determined by the following equation:

$$f = \frac{V5}{(V6 + eV7)^2}$$

V5, V6 and V7 being constant parameters in the elementary phase, all these parameters being determined prior to this phase accrording to the selected acquisition geometry, the type of operation and the monodimensional sets in question, adding this weighted contribution to the numerical value of the relevant point of the unknown space determined during the preceding elementary phases which placed the point of the unknown space in correspondence with points of other known monodimensional spaces, all the contributions obtained at the end of the method to determine the unknown space thus constituting the final value of this point.

According to a first variant of the method for determining a space from a known discrete space, the elementary phase represents a parallel geometry retroprojection operation, the known space being a set of projection data indexed by l,m and n; m and n are fixed, the unknown space is the image space indexed by i, j, k (j and k) or (i and k) are fixed; the sought-after index $a_0$ (e) is either the index $l_0$ (j) when i and k are fixed, the axis E being indexed by j and the axis F by l, or the index $l_0$ (i) when j and k are fixed, the axis E being indexed by i and the axis F by l; and the following are then selected:

$V3 = 1$ $V4 = 0$ and for i fixed at $i_0$, k=0, m=0, n=$n_0$, $l_0$ (j) being sought $V1 = L_0 + i_0 \Delta I$ $V2 = \Delta J$ $e = j$ or for j fixed at $j_0$, k=0, m=0, n=$n_0$, $l_0$ (i) being sought $V1 = L_0 + j_0 \Delta J$ $V2 = \Delta I$ $e = i$ the terms $L_0$, $\Delta I$ and $\Delta J$ being predetermined, $l_0$ being a real whole number of the entire part 1.

According to a second embodiment variant of the method to determine a space from a known discrete space, the elementary phase represents a parallel geometry reprojection operation, the known space being the image space indexed by l, m and n; (m and n) or (l and m) being fixed, the unknown space being the set of data of the projection indexed i, j, k, j and k being fixed; the sought index $a_0$ (e) being the index $l_0$ (i) or $n_0$(i), the axis E then being indexed by i and the axis F being indexed by l or n and the following is then selected:

m fixed at 0, n at $n_0$, j at $j_0$, k at 0, $l_0$ (i) is sought $V3 = 1$ $V4 = 0$ $V1 = h_1(n_0, j_0)$ $V2 = \Delta L_1(j_0)$ $e = i$ or m fixed at 0, l at $l_0$, j at $j_0$, k at 0; $n_0$ (i) is sought $V3 = 1$ $V4 = 0$ $V1 = h_2(l_0, j_0)$ $V2 = \Delta L_2(j_0)$ $e = i$ the terms $h_1$, $h_2$, $\Delta L_1$ and $\Delta L_2$ being predetermined and $n_0$ and $l_0$ are real numbers of respectively the entire part n and l.

According to a third embodiment of the method for determining a space from a known discrete space, the elementary phase represents a fan-shaped geometry retroprojection operation with constant linear pitches, the known space being the set of projection data indexed by l, m and n; m and n are fixed, the unknown space being the image space indexed by i, j, k, (i and k) or (j and k) being fixed, the sought-after index $a_0$ (e) being either the index $l_0$ (i) or $l_0$ (j), the axis E being indexed by i or by j and the axis F by l and the following is then selected:

k=0, m=0, n=$n_0$, j=$j_0$, $l_0$ (i) being sought, $V1 = h_3 (j_0, n_0)$ $V2 = h_4 (n_0)$ $V3 = h_5 (j_0, n_0)$ $V4 = h_6 (n_0)$ $e = i$ or: k=0, m=0, n=$n_0$, i=$i_0$, $l_0$ (j) being sought, $V1 = h'_3 (i_0, n_0)$ $V2 = h'_4(n_0)$ $V3 = h'_5(i_0, n_0)$ $V4 = h'_6(n_0)$ $e = j$.

the terms $h_3$, $h_4$, $h_5$, $h_6$, $h'_3$, $h'_4$, $h'_5$, $h'_6$ being predetermined and $l_0$ is a real number of the entire part l.

According to a fourth embodiment variant of the method for determining a space from a known discrete space, the elementary phase represents a constant linear pitch fan-shaped geometry reprojection operation, the known space being the image space indexed by l, m, n; (m and n) or (l and m) being fixed, the unknown space being the set of projection data indexed by i, j, k where j and k are fixed, the sought-after index $a_0$ (e) being the index $l_0$ (i) or $n_0$ (i), the axis E being indexed i and the axis F by l or n and the following is then selected:

m fixed at 0, n at $n_0$, j at $j_0$, k at 0, $l_0$ (i) being sought, $V1 = h_7(n_0, j_0)$ $V2 = h_8(n_0, j_0)$ $V3 = h_9(j_0)$ $V4 = h_{10}(j_0)$ $e = i$ or:

m fixed at 0, l at $l_0$, j at $j_0$, k at 0, $n_0$ (i) being sought, $V1 = h'_7(l_0, j_0)$ $V2 = h'_8(l_0, j_0)$ $V3 = h'_9(j_0)$ $V3 = h'_{10}(j_0)$ $e = i$ the terms $h_7$, $h_8$, $h_9$, $h_{10}$, $h'_7$, $h'_8$, $h'_9$ and $h'_{10}$ being predetermined and $n_0$, $l_0$ being respectively real numbers of the entire part n and l.

According to a fifth embodiment variant of the method to determine a space from a known discrete space, the elementary phase represents a conical geometry retroprojection operation; the unknown space is an image space indexed by i, j and k (j and k being fixed), the known space being the projection space indexed by l, m and n (n being fixed and m fixed depending on j and k), the sought index $a_0$ (e) being the index $l_0$(i), the axis E being indexed by i and the axis F by l, and the following is then selected;

$V3 = 1$
$V4 = 0$ $V1 = \dfrac{Z_0 C - Q_0}{\Delta Q}$ $V2 = \dfrac{C \cdot \Delta Z}{\Delta Q}$ the terms $Z_0$, C, $Q_0$, $\Delta Z$ and $\Delta Q$ being predetermined and $l_0$ being a real number whose entire part is l.

According to a sixth embodiment variant of the method to determine a space from a known discrete space, the elementary phase represents a conical geometry reprojection operation, the unknown space being the projection space indexed by i, j and k (j and k being fixed), and the known space being the image space indexed by l, m and n (m being fixed, n being fixed dependent on j and k); the sought index $a_0$ (e) being the index $l_0$(i), the axis E being indexed by i and the index F by l and the following is then selected:

$V3 = 1$
$V4 = 0$ $V1 = \dfrac{Q C - Z_0}{\Delta Z}$ $V2 = C \times \dfrac{\Delta Q}{\Delta Z}$ the terms $Z_0$, $Q_0$, C, $\Delta Z$ and $\Delta Q$ being predetermined and $l_0$ being a real number whose entire part is l.

According to a seventh embodiment variant of the method to determine a space from a known discrete space, for a parallel and conical geometry in the case where the elementary phase represents a retrojection and for a parallel geometry when this phase represents a reprojection, the weighting factor f is determined by taking:

$$V7 = 0$$

$$V6 = 1 \text{ and } V5 \text{ is predetermined.}$$

According to an eighth embodiment variant of the method to determine a space from a known discrete space, in the weighting stage for a fan-shaped geometry in the case of a retroprojection, the weighting factor f is determined by taking:

V5 predetermined on the basis of the parameters of the acquisition device $$V6 = V3$$

$$V7 = V4.$$

According to a ninth embodiment variant of the method to determine a space from a known discrete space, in the weighting stage for a conical and fan-shaped geometry in a case of reprojection, the weighting factor f is determined by taking:

$$V5 = 1$$

$$V6 = 1$$

$$V7 = 0.$$

In this case, the weighting may be deferred until after the elementary phase.

The invention further consists of providing a device to implement the method, wherein it further comprises in addition to the acquisition device:

address generation means receiving the parameters V1 to V4 delivering the address ADR which is the entire part of $a_0$ (e);

means to store the numerical values of the points of the known space addressed by the generation means delivering the set of $(\alpha + 1)$ numerical values of the points of the known space from $V(ADR - \beta)$ to $V(ADR + \gamma)$ ($\beta$ and $\gamma$ being positive integers; $\beta + \gamma = \alpha$) corresponding to the index ADR, $\alpha$ being the order of interpolation;

interpolation means receiving the numerical values $V(ADR - \beta)$ to $V(ADR + \gamma)$ contained in a memory and addressable by the ADR index and determining at the end of interpolation of a non-weighted contribution to the numerical value of each corresponding point of the unknown space;

weighting means receiving each non-weighted contribution and the parameters V5, V6 and V7 to deliver each weighted contribution;

addition means to add to the numerical value of the current point of the unknown space the weighted contribution relating to this current point;

storage means containing the current value.

In addition, the invention consists of a second device to implement the method, wherein it comprises, apart from the acquisition device:

address generation means receiving the parameters V1 to V4 delivering the address ADR which is the entire section $a_0$ (e); these same address generation means also provide the addresses of the elements of the unknown space;

means to store the numerical values of the points of the known space and the numerical values of the points of the unknown space addressed by the address generation means, thus delivering the numerical values of the known space from $V(ADR - \beta)$ to $V(ADR + \gamma)$ ($\beta$ and $\gamma$ being positive integers; $\beta + \gamma = \alpha$) corresponding to the index ADR, $\alpha$ being the order of interpolation, thus delivering the numerical values of the data of the unknown space corresponding to the calculations carried out and receiving the numerical values of the unknown space after processing;

an operative unit receiving the coefficients for interpolation, receiving the parameters V5, V6 and V7 so as to weight the contribution and add it to the value of the point during processing of the unknown space, these operations being carried out intrinsically to this operative unit.

The object of the invention is also to apply the method to the reconstruction by synthesis and the inversion of the RADON transform.

According to the method, reconstruction by synthesis and inversion of the transform comprises three stages:

a first stage consisting of a parallel geometry bidimensional reprojection making it possible to obtain the RADON transform;

a second stage consisting of a parallel geometry bidimensional retroprojection making it possible to obtain rearranged projections;

a third stage consisting of a parallel geometry bidimensional retroprojection making it possible to obtain the sought-after final volume.

BRIEF DESCRIPTION OF THE DRAWINGS

Other characteristics and advantages of the invention shall appear more readily from a reading of the following description, given by way of illustration and being in no way restrictive, with reference to the accompanying drawings in which:

FIG. 5 represents the case of a retroprojection with a parallel geometry acquisition device, FIG. 6 represents a reprojection with a parallel geometry device.

DETAILED DESCRIPTION OF THE PREFERRED EMBODIMENTS

Figure 1:
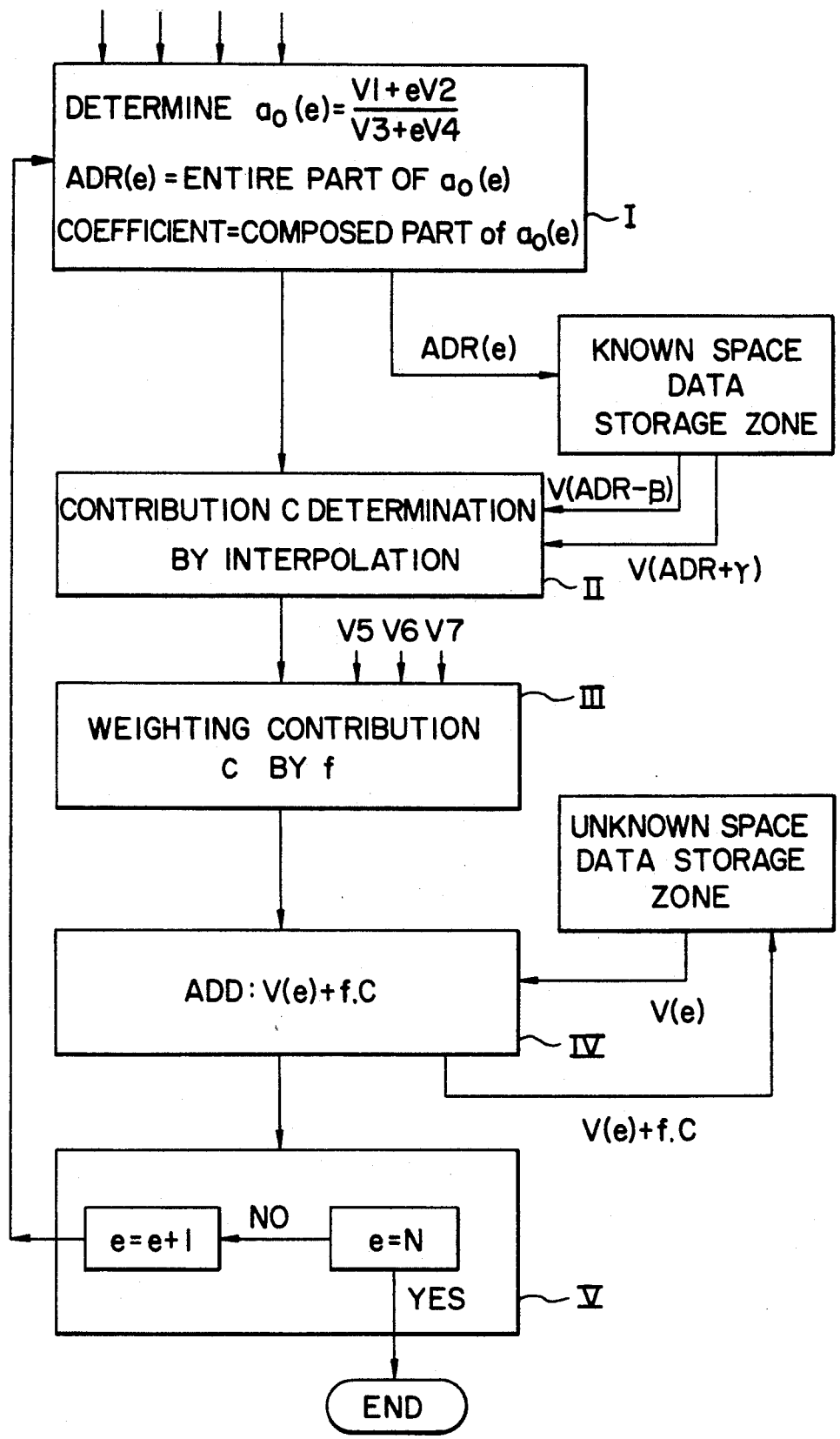
FIG. 1 represents the main stages of the method in the form of a succession of blocks, each block corresponding to one particular stage in accordance with the invention.

FIG. 1 makes it possible to show in the form of a succession of blocks the various stages of the method of the invention.

Firstly, several definitions are listed.

A known discrete space is regarded as a digitalized bidimensional (2D) or tridimensional (3D) space, that is a space defined by a set of elementary points corresponding to 2D pixels or 3D voxels.

The coordinates of the points are digitalized in the image or volume space and in the projection space. These points are referenced by their index letters i, j, k in the unknown space and by l, m, n in the known space.

It is to be also noted that in the reprojection operation, the image or volume space is known and the projection space is to be calculated. In the retroprojection operation, the projection space is known and the image or volume space is to be calculated.

According to the method of the invention, the elementary phase as previously defined comprises a set of stages which shall make it possible to determine the contribution to the value of a point of the unknown space on the basis of the value of the corresponding point (and from its vicinity) of the known space, this determination being effected for both the retroprojection and reprojection operations and for a large number of acquisition geometries.

In order to achieve this, this phase comprises a stage to determine an index or address in the known space followed by determination of the contribution by interpolation concerning the data adjacent to this address and finally a stage for weighting this contribution.

All these stages are renewed by the iteration of an index appearing in determination of the address until this index has reached its upper limit N, that is the number of elementary points characterizing the number of points along an axis of the unknown space (size of the space).

Determination of the address (stage I)

Generally speaking and according to the address of a point of the space to be calculated, this stage consists of determining the address of the corresponding point in the known space. The address calculation is strictly linked to the acquisition geometry and introduces the affine change of mark formulae. However, in accordance with the invention, the determination of the address in the elementary phase is reduced to determining the entire part ADR of the value a (e) by the following equation:

$$a_0(e) = \frac{V1 + eV2}{V3 + eV4}$$

in which the parameters V1, V2, V3 and V4 are predetermined according to the acquisition geometry and the type of operation carried out (retroprojection or reprojection) and the monodimensional units in question.

e is the iteration index corresponding to the address of one point of the unknown space.

Determination of the contribution C (stage II)

In this stage, points are used belonging to the known space adjacent to the address ADR previously calculated to carry out an interpolation.

Interpolation is made on the basis of conventional methods. This may be a zero order interpolation or be the immediately adjacent interpolation or a higher order interpolation. for a higher order interpolation and for an address provided by the address calculation stage, several items of data of the known space in the vicinity of this address need to be extracted.

The interpolation coefficients used in this stage are generally determined from the composed section of $a_0$ (e).

Weighting of the contribution (stage III)

Weighting consists of applying a weighting factor f whose parameters V5, V6 and V7 are predetermined according to the acquisition geometry and the type of operation, as well as the monodimensional units in question.

Addition of the weighted contribution to the current address (stage IV)

This stage consists of adding the weighted contribution to the relevant point of the space to be calculated, namely of calculating V(e)+f.C, V(e) being the value to the address e of the point of the unknown space prior to calculation, V(e)+f.C its value after calculation.

Iteration of the index letter e (stage V)

This final stage consists of incrementing the index letter e and of restarting all the preceding stages until the value N is reached (N corresponding to the number of elementary points on the line of this space).

The rest of the description shall show in detail the various stages according to various applications, each corresponding to a particular choice of the type of acquisition geometry.

Figure 2:
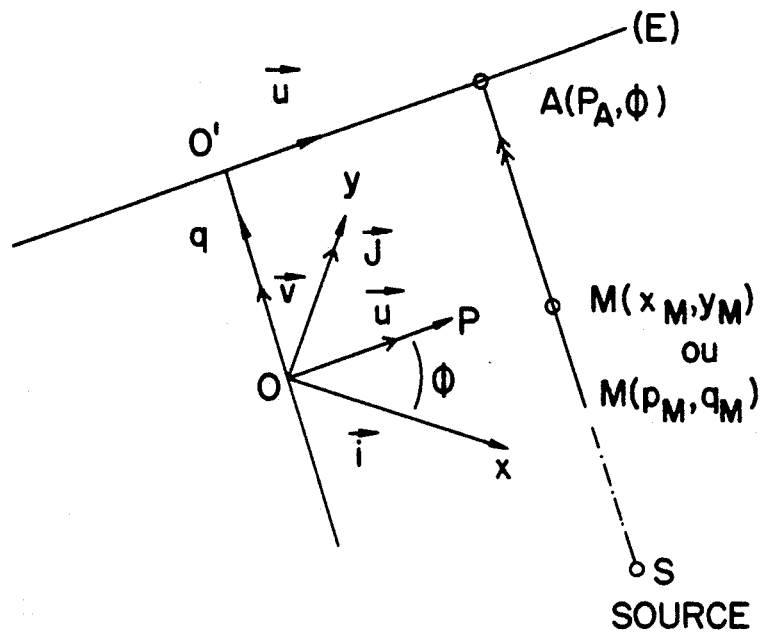
FIG. 2 represents a geometric figure making it possible to recall the 2D parallel geometry acquisition principle.
Figure 3:
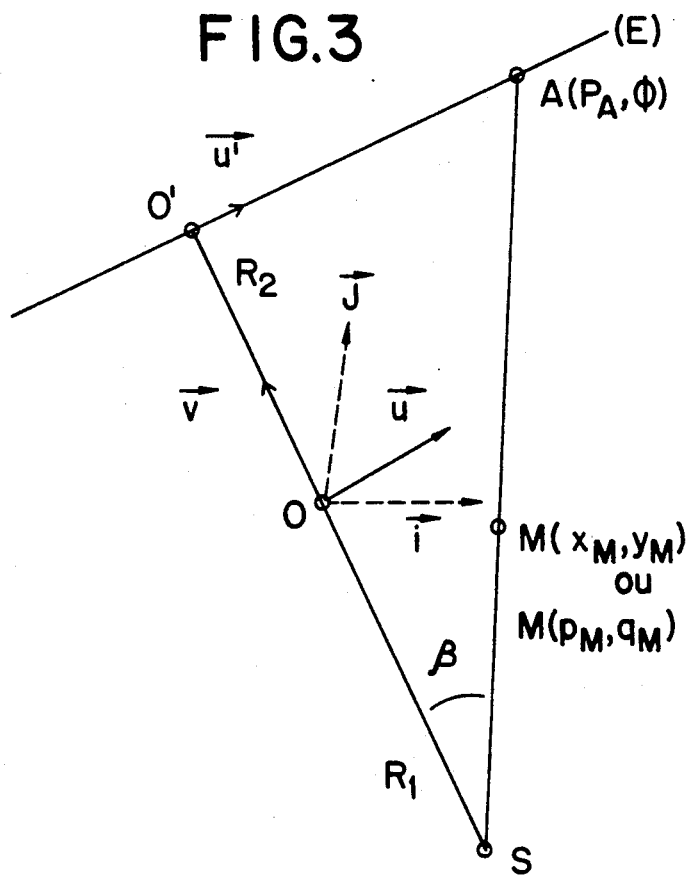
FIG. 3 represents a geometric figure making it possible to recall the 2D fan-shaped geometry acquisition principle.
Figure 4:
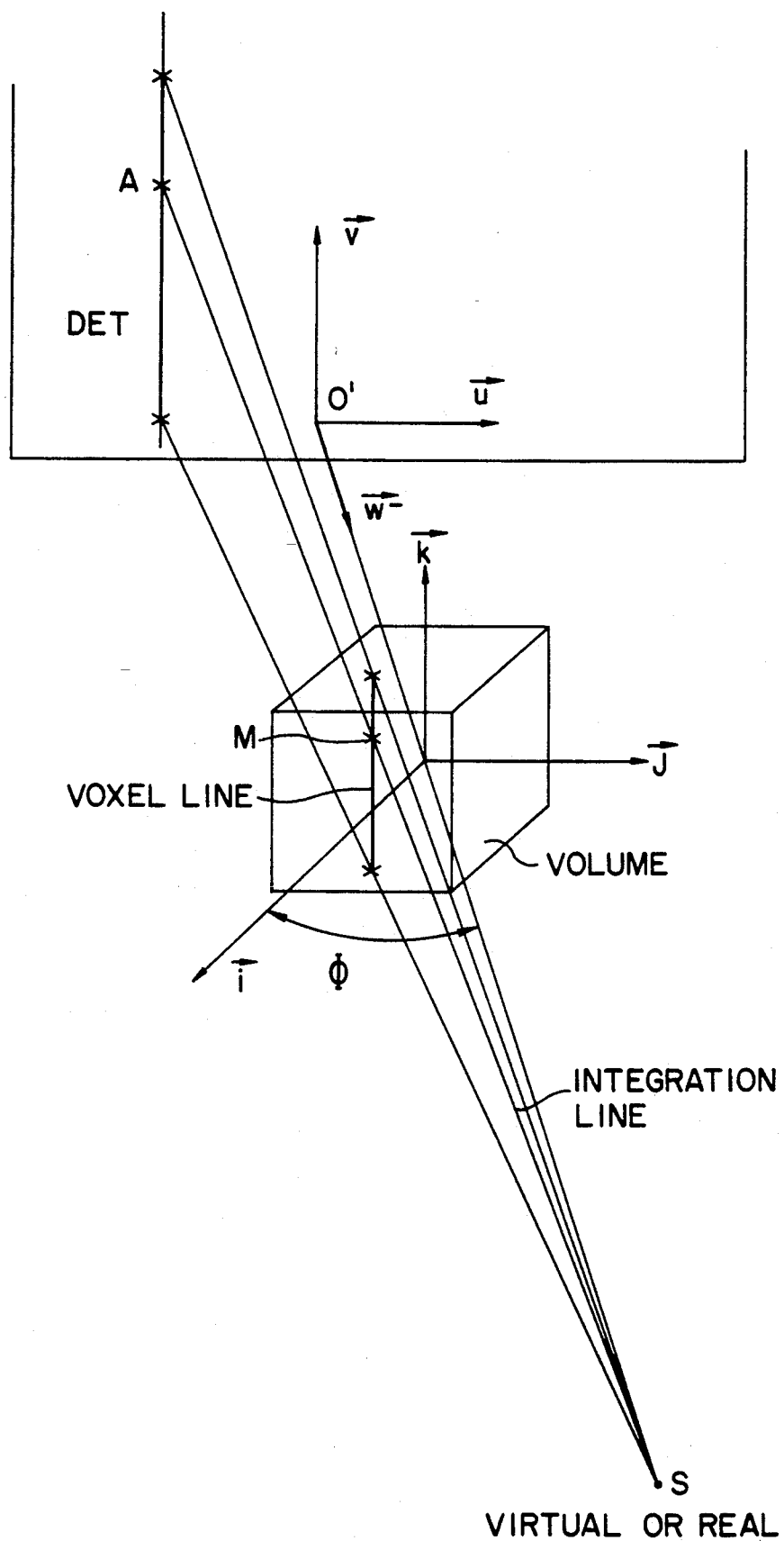
FIG. 4 represents a geometric figure making it possible to recall the 3D conical geometry acquisition principle.

First of all, with the aid of FIGS. 2, 3 and 4 respectively, the principle is recalled of a 2D parallel geometry, a 2D fan-shaped geometry and a 3D conical geometry. S is the real or virtual radiation source.

In FIGS. 2 and 3, a point M of the object space is characterized by its coordinates $M(x_M, y_M)$ or $M(p_M, q_M)$, $(x_M, y_M)$ in a mark (0, i, j) and $(p_M, q_M)$ in a mark (O, $\bar{u}$, $\bar{v}$) which is the mark linked to the angle projection $\phi$. The points of the projection on the axis E are noted $A(p_A, \phi)$, $p_A$ being the coordinate linked to the mark (O', u).

In the fan-shaped case of FIG. 3, the ray R1 characterizes the source-center distance O of the mark (O, $\bar{u}$, $\bar{v}$) and R2 the center distance of the mark at the detector O'.

The coordinates are sampled in the object space by:

$x(i) = X_0 + i \Delta X$, i and j being whole numbers
$y(j) = Y_0^2 + j \Delta Y$
$\Delta X$ and $\Delta Y$ being sampling pitches.

The coordinates on the projection axis E is given by the equation:

$p(l) = P_0 + l\Delta P$, l being a whole number $\Delta P$ being the sampling pitch.

A point M is marked in the mark O,i,j by $x_M$ and $y_M$ and in the mark O, $\vec{u}$, $\vec{v}$ by $p_M$ and $q_M$ with:

$$p_M = x_M \cos\phi + y_M \sin\phi$$

$$q_M = -x_M \sin\phi + y_M \cos\phi$$

In the case of a conical acquisition geometry (3D) as represented on FIG. 4, the unit DET formed by the points A relating to the points M of a volume column (VOL) forms a column in the projection (DET) parallel to the axis of rotation k. The elementary phase also makes it possible in this case of conical geometry to place in relation the sets of elements (of the known space and the space to be reconstructed) belonging to straight lines parallel to the axis of rotation k.

The method of the invention is entirely applicable to conical geometry and parallel geometry reprojection and retroprojection as the elementary phase comprises iterations concerning the elements of the space to be reconstructed and merely requires a single operation to determine the address (as regards all the known space) of the corresponding element.

FIG. 5 represents the case of retroprojection for a 2D parallel geometry. In this case, the parameters V1, V2, V3 and V4 used to determine the address are precalculated.

The unknown image space is sampled as:

$$x(i) = X_0 + i\Delta X$$

$$y(j) = Y_0 + j\Delta Y$$

$$z(k) = 0 \text{ hence } k = 0$$

The known projection space is sampled as:

$$p(l) = P_0 + l\Delta P$$

$$q(m) = 0 \text{ therefore } m = 0$$

$$\phi(n)$$

The parameters V1, V2, V3 and V4 are precalculated as follows:

$m = 0$, n fixed at $n_0$, $k = 0$ l depends on i j is therefore fixed at $j_0$ $V3 = 1$ $V4 = 0$ $e = i$ $V1 = L_0 + j_0 \Delta J$ $V2 = \Delta I$ or $m = 0$, n fixed at $n_0$, $k = 0$ l depends on i $V3 = 1$ $V4 = 0$ $e = j$ $V1 = L_0 + i_0 \Delta I$ $V2 = J$ and with $\Delta I = \frac{\Delta X}{\Delta P} \cdot \cos\phi(n_0)$ $\Delta J = \frac{\Delta Y}{\Delta P} \cdot \sin\phi(n_0)$ $L_0 = \frac{O}{\Delta P} \cdot \cos\phi(n_0) + \frac{O}{\Delta P} \cdot \sin\phi(n_0) - \frac{O}{\Delta P}$.

$X_0$, $Y_0$, $\Delta P$, $P_o$, $\sin\phi(n_0)$, $\cos\phi(n_0)$, $\Delta X$ and $\Delta Y$ being known.

In the case of FIG. 5, the known projection space is indexed by l, $m = 0$ and $n = n_0$. The unknown space is the image space indexed i, j, k; $k = 0$, i or j are fixed; the sought-after address is $l_0$ (i) if j is fixed at j or $l_0$ (j) if i is fixed at $i_0$.

FIG. 6 represents the case of reprojection for a 2D parallel geometry. In this case, the coordinates are sampled as follows:

$$x(l) = X_0 + l\Delta X$$

$$y(n) = Y_0 + n\Delta Y$$

$$z(m) = 0$$

firstly for the known image space, and $p(i) = P_0 + i\Delta P$ $q(k) = 0$ hence $k = 0$ $\phi(j)$ secondly for the unknown projection space.

The parameters V1, V2, V3 and V4 used for determination are precalculated as follows:

$m = 0$, $k = 0$, $j = j_0$ n fixed at n $e = i$ and $l_0$ (i) is sought $V3 = 1$ $V4 = 0$ $$V1 = \frac{P_0}{\Delta X \cos\phi(j_0)} - (Y_0 + n_0\Delta Y) \cdot \frac{\sin\phi(j_0)}{\Delta X \cdot \cos\phi(j_0)} - \frac{X_0}{\Delta X}$$

$$V2 = \frac{\Delta P}{\Delta X \cos\phi(j_0)}$$

or $m = 0$, $k = 0$, $j = j_0$ l fixed at $l_0$ $e = i$ and $n_0$ (i) is sought $V3 = 1$ $V4 = 0$ $$V1 = \left( \frac{P_0}{\Delta Y \sin\phi(j_0)} - \frac{(X_0 + l_{0\Delta X})\cos\phi(j_0))}{\Delta Y \sin\phi(j_0)} - \frac{Y_0}{\Delta Y} \right)$$

and $V2 = \left( \frac{\Delta P}{\Delta Y \sin\phi j_0} \right)$ $X_0$, $Y_0$, $\Delta P$, $P_0$, $\sin \Phi(j_0)$, $\cos \Phi(j_0)$, $\Delta X$, $\Delta Y$ being known.

In the case of FIG. 6, the known space is the image space indexed by l, m, n, m=0, l or n being fixed; the unknown space is the projection space indexed by i, j, k, k=0 and j=j$_0$, the sought address is l$_0$ (i) if n is fixed at n$_0$, or n$_0$(i) if l is fixed at l$_0$.

Figure 7:
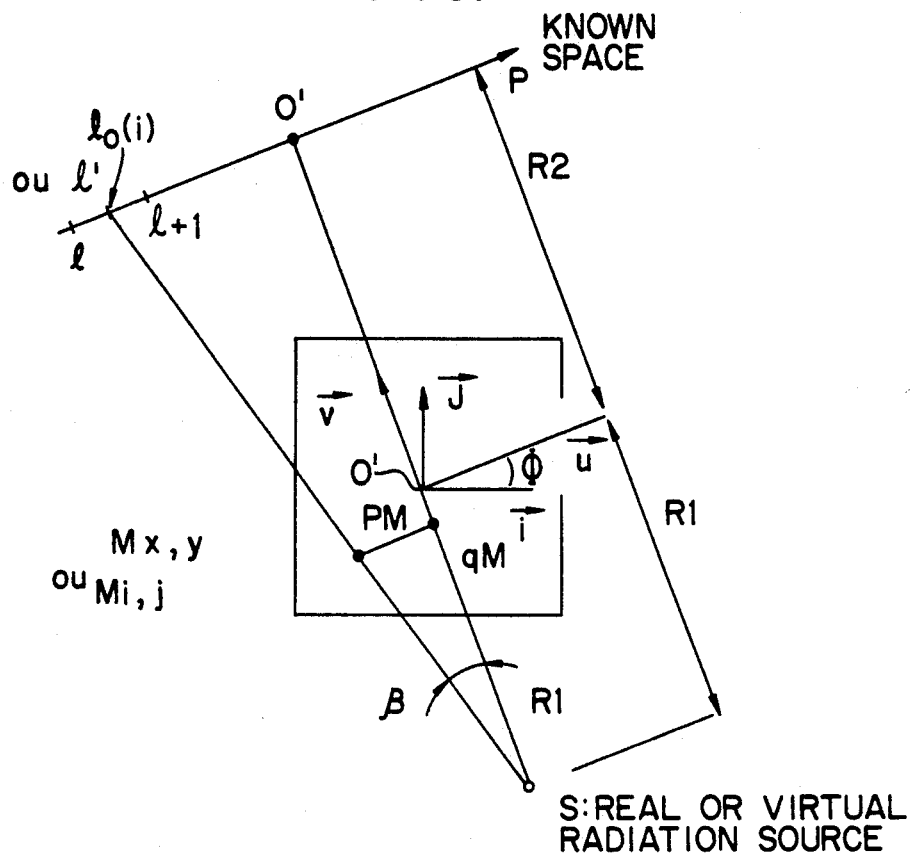
FIG. 7 represents a retroprojection with a fan-shaped geometry device.

FIG. 7 represents the case of the fan-shaped geometry retroprojection. In this case, the coordinates of the spaces are sampled as:

| unknown image space | known projection space |
|---|---|
| $x(i) = X_0 + i \Delta X$ | $p(l) = P_0 + l \Delta P$ |
| $y(j) = Y_0 + j \Delta Y$ | $q(m) = 0, m = 0$ |
| $z(k) = 0, k = 0$ | $\phi(n)$ |

V1, V2, V3 and V4 are precalculated as follows:

$$V1 = \frac{1}{\Delta P} X_0 \cos\phi(n_0) + y(j_0)\sin\phi(n_0) -$$

$$\frac{0}{R1 + R2} [R1 + y(j_0)\cos\phi(n_0) - X_0 \sin\phi(n_0)]$$

$$V2 = \frac{1}{\Delta P} \Delta X \cos\phi(n_0) + \frac{P_0 \Delta X}{R1 + R2} \cdot \sin\phi(n_0)$$

$V3 = R1 - X_0 \sin\phi(n_0) + y(j_0)\cos\phi(n_0)$ $V4 = -\Delta X \sin\phi(n_0)$ or m = 0, k = 0, n fixed at n$_0$, e = j and i fixed at i$_0$. l$_0$(j) is sought.

$$V1 = \frac{1}{\Delta P} Y_0 \sin\phi(n_0) + x(i_0)\cos\phi(n_0) -$$

$$\frac{P_0}{R1 + R2} [R1 + Y \cos\phi(n_0) - x(i_0)\sin\phi(n_0)]$$

$$V2 = \frac{1}{\Delta P} \Delta Y \sin\phi(n_0) - \frac{P_0}{R1 + R2} \Delta Y \cos\phi(n_0)$$

$V3 = R1 - x(i_0)\sin\phi(n_0) + Y_0 \cos\phi(n_0)$
$V4 = \Delta Y \cos\phi(n_0)$ all the coefficients used to precalculate these parameters being known.

In the case of FIG. 7, the known projection space is indexed by l, m, n, m=0, n=n$_0$, the unknown space being the image space indexed by i, j, k, k=0, i or j fixed, the sought-after address being l$_0$ (i) if j is fixed at j$_0$ or l$_0$ (j) if i is fixed at i$_0$.

R1: source/center distance of the object mark.
R2: center distance of the object mark/detector.

Figure 8:
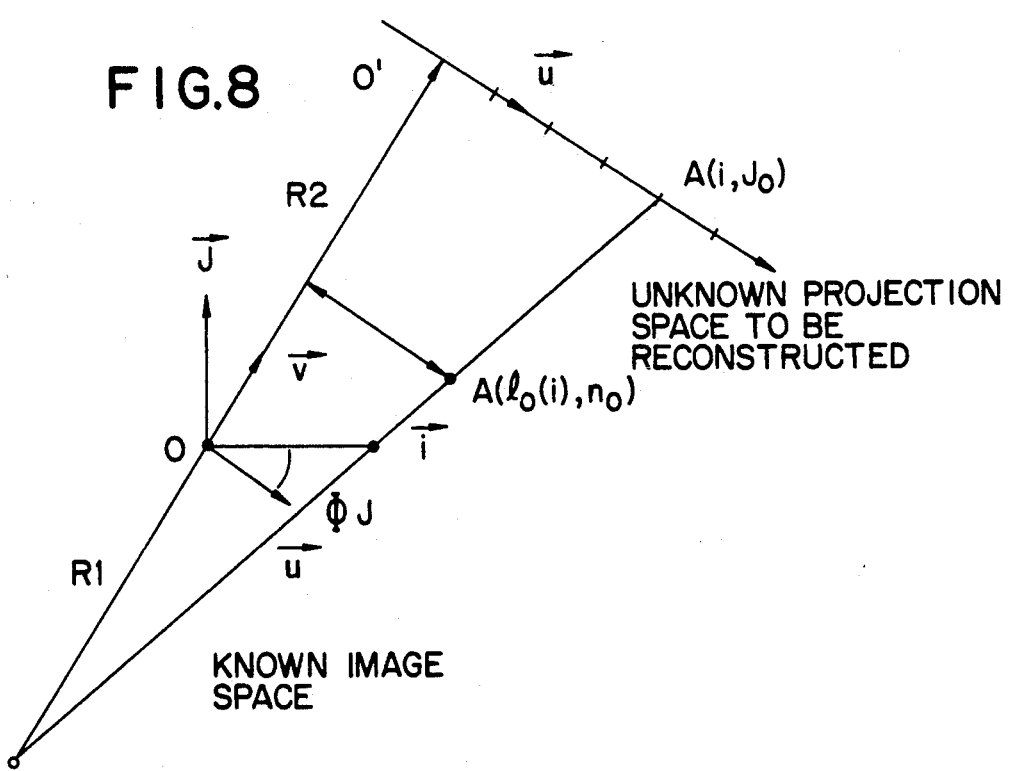
FIG. 8 represents a reprojection with a fan-shaped geometry device.

FIG. 8 represents the case of a fan-shaped geometry reprojection. In this case, the coordinates of the spaces are sampled as follows:
unknown image space $x(l) = X_0 + l \Delta X$ $y(n) = Y_0 + n \Delta Y$ $z(m) = 0$ giving m = 0 known projection space $p(i) = P_0 + i \Delta P$ $q(k) = 0$ giving $k = 0$ $\phi(j)$ In this case, the parameters V1, V2, V3 and V4 used to determine the address are precalculated as follows: m=0, k=0, j=j$_0$, n=n$_0$, e=i l$_0$ (i) is sought.

$$V1 = P_0 \frac{[R1 = y(n_0)\cos\phi(j_0) - X_0 \sin\phi(j_0)]}{R1 + R2}$$

$y(n_0)\sin\phi(j_0) - X_0 \cos\phi(j_0)$.

$$V2 = \frac{[R1 + y(n_0)\cos\phi(j_0) - X_0 \sin\phi(j_0)]}{R1 + R2} \Delta P$$

$$V3 = \frac{P_0 \Delta X}{R1 + R2} \sin\phi(j_0) + \Delta X \cos(j_0)$$

$$V4 = \frac{\Delta P \cdot \Delta X \sin\phi(j_0)}{R1 + R2}$$

or even m = 0, k = 0, j = j$_0$, e = i, l fixed at l$_0$
n$_0$(i) is sought.

or even m=0, k=0, j=j$_0$, e=i, l fixed at l$_0$ n$_0$ (i) is sought.

$$V1 = \frac{P_0}{R1 + R2} [R1 - x(l_0 \sin\phi(j_0) + Y_0 \cos\phi(j_0)] -$$

$x(l_0)\cos\phi(j_0) - Y_0 \sin\phi(j_0)$ $$V2 = \frac{\Delta P}{R1 + R2} [R1 - x(l_0)\sin\phi(j_0) + Y \cos\phi(j_0)]$$

$$V3 = \Delta Y \left[ \sin\phi(j_0) - \frac{0}{R1 + R2} \cdot \cos\phi(j_0) \right]$$

$$V4 = -\Delta Y \frac{\Delta P}{R1 + R2} \cdot \cos\phi(j_0)$$

all the coefficients used to precalculate these parameters being known.

In the case of FIG. 8, the known space is the image space indexed by l, m, n, m=0, l or n being fixed; the unknown space is the projection space indexed by i, j, k, k=0, j=j$_0$; the sought-after address is l$_0$ (i) if n is fixed at n$_0$ or n$_0$ (i) if l is fixed at l$_0$.

R1=center-source distance of the object mark
R2=center distance of the object mark/detector.

Figure 9:
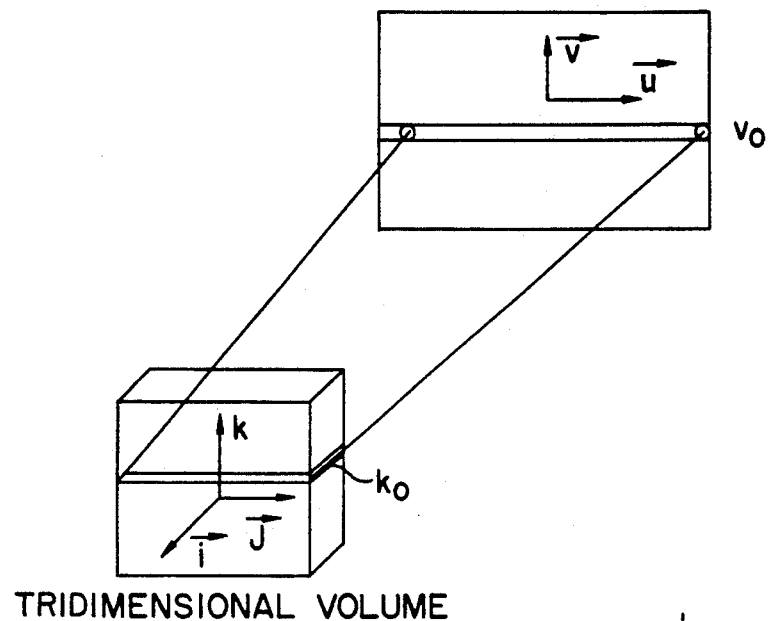
FIG. 9 represents the case of 3D parallel geometry retroprojection and reprojection.

FIG. 9 represents the case of 3D parallel geometry reprojections and retroprojections.

An altitude plane k$_0$ always extends into the angle projection $\phi$ (regardless of $\phi$) at a constant altitude v$_0$. The retroprojections or reprojections in this geometry are a succession of 2D parallel geometry retroprojections and reprojections. In this case, determination of the address is as already described concerning cases of parallel geometry 2D reprojection and retroprojection.

Figure 10:
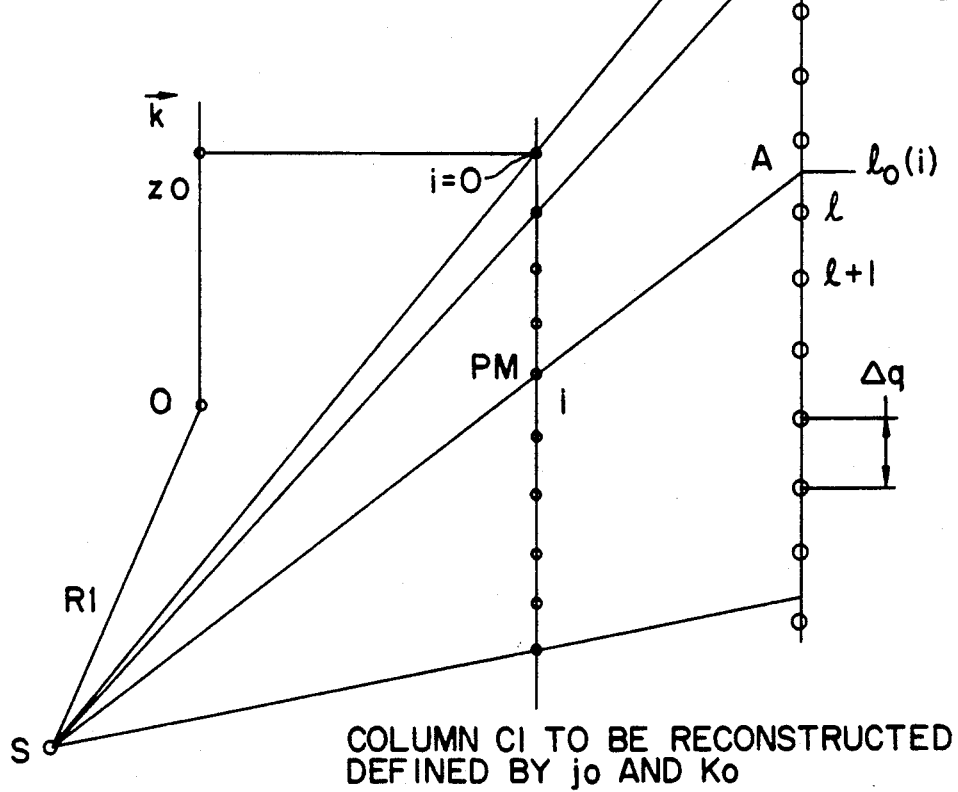
FIG. 10 represents the addressing diagram in the elementary phase for a 3D conical geometry retroprojection.

FIG. 10 represents the case of a 3D conical geometry retroprojection. In this case, the section of the space to be reconstructed is rendered immobile so that $k=k_0$ and $j=j_0$ which gives $x(k_0)$ and $y(j_0)$ rendered immobile.

The section of the known space is rendered immobile so that $n=n_0$ which renders $\phi$ immobile at $\phi(n_0)$ and $m=m'$ rendered immobile, since m depends on k and j. The sought-after address is $l_0$ (i). The parameters V1, V2, V3 and V4 used to determine the address are precalculated as follows:

$$V3 = 1$$
$$V4 = 0$$
$$V1 = \frac{Z_0 \cdot C - Q_0}{\Delta Q}$$
$$V2 = \frac{C\Delta Z}{\Delta Q}$$

All the coefficients occuring in these calculations are known. In fact, the coordinates are sampled as follows:

$$x(k) = X_0 + k\Delta X$$
$$y(j) = Y_0 + j\Delta Y$$
$$z(i) = Z_0 + i\Delta Z$$
$$\phi(n)$$
$$p(m) = P_0 + m\Delta P$$
$$q(l) = Q_0 + l\Delta Q$$

$$C = \frac{R1 + R2}{R2 + l_M(k_0, j_0, n_0)}$$

$l_n$ depends on $k_0$, $j_0$ and $n_0$
$l_M(k_0, j_0, n_0) = x(k_0) \sin\phi(n_0) - y(j_0) \cos\phi(n_0)$
R1 = source/center distance of the object mark
R2 = center distance of the object mark/detector In the case of a 3D conical geometry reprojection, the sought address is $l_0$ (i).

The section of the space to be reconstructed which is rendered immobile is for $k=k_0$ and $j=j_0$ thus rendering $\phi$ immobile at $\phi(k_0)$ and p at $p(j_0)$.

The first dimension rendered immobile in the known space defines a plane $m=m$ which renders immobile the abscisse x at $x(m_0)$. The second dimension is rendered immobile at $y(n')$ as n depends on j, k and m.

The parameters V1, V2, V3 and V4 used to determine the address are precalculated as follows:

$$V1 = \frac{Q_0 C - Z_0}{\Delta Z}$$
$$V2 = \frac{C\Delta Q}{\Delta Z}$$

with $$C = \frac{R2 l_M k_0 m_0 n'}{R1 + R2}$$

$$n' = \frac{p(j_0)[R2 + x(m_0)\sin\phi(k_0) - Y_0\cos\phi(k_0)]}{\Delta Y[(R1 + R2)\sin\phi(k_0) + p(j_0)\cos\phi(k_0)]}$$

$$\frac{(R1 + R2)[x(m_0)\cos\phi(k_0) + Y_0\sin\phi(k_0)]}{\Delta Y[(R1 + R2)\sin\phi(k_0) + p(j_0)\cos\phi(k_0)]}$$

and with $$l_M(k_0, m_0, n') = x(m_0)\sin\phi(k_0) - y(n')\cos\phi(k_0)$$
$$V3 = 1$$
$$V4 = 0$$

R1: source/center distance of the object mark.
R2: center distance of the object mark/detector.

All the other coefficients occuring in this precalculation are known.

The space has been sampled as follows:

$$x(m) = X_0 + m\Delta X$$
$$y(n) = Y_0 + n\Delta Y$$
$$z(l) = Z_0 + l\Delta Z$$
$$\phi(k)$$
$$p(j) = P_0 + j\Delta P$$
$$q(i) = Q_0 + i\Delta Q$$

In accordance with the method of the invention, the weighting stage consists of applying a weighting factor f so that:

$$f = \frac{V5}{(V6 + eV7)^2}$$

the parameters V5, V6 and V7 depending on the acquisition geometry and the type of projection carried out.

In the case of a 2D parallel geometry retroprojection, conical geometry retroprojection, 3D parallel and conical retroprojection and 2D and 3D parallel reprojection, V5 is selected by the user
$V6 = 1$
$V7 = 0$ In the case of a fan-shaped retroprojection, V5 is selected as equal to $(R1+R2)^2$, $V6 = V3$, $V7 = V4$.

In the case of a 2D fan-shaped and conical reprojection:

$V5 = 1$
$V6 = 1$
$V7 = 0$

Figure 11:
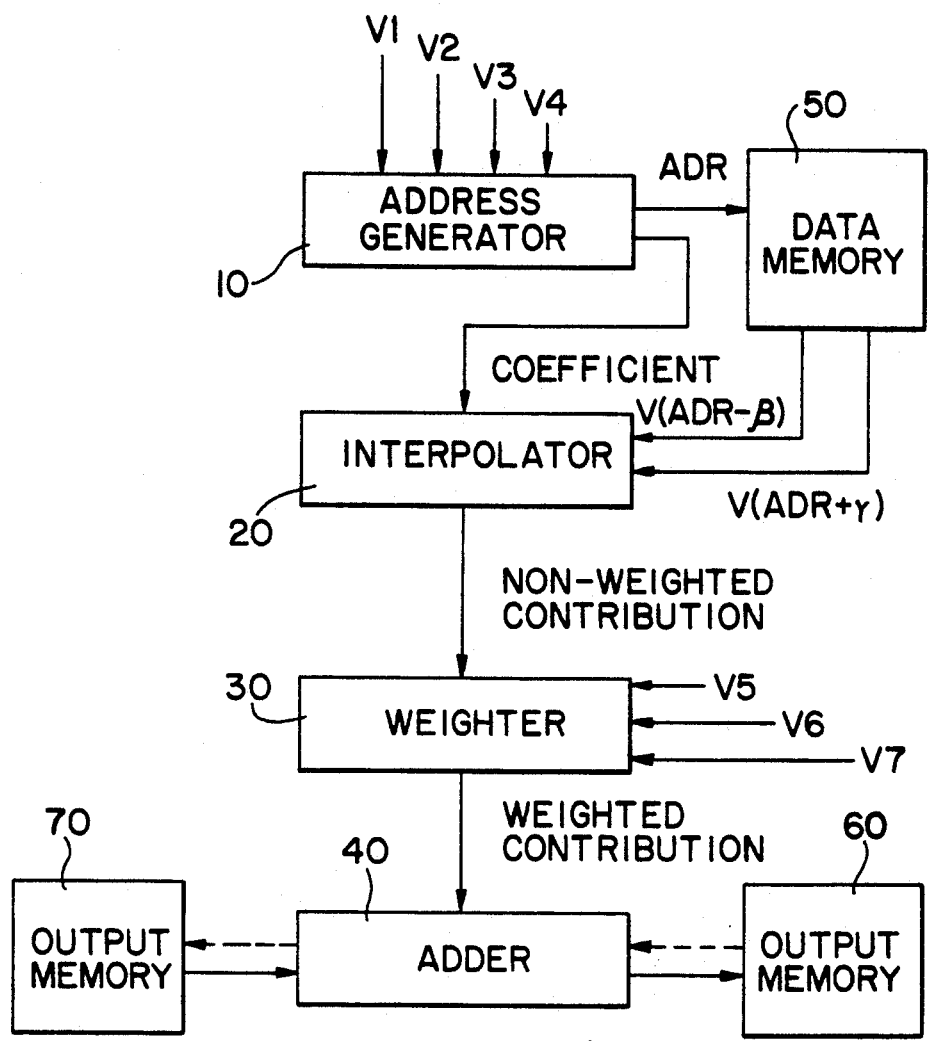
FIG. 11 represents the diagram of the device to implement the method of the invention according to a first embodiment.

FIG. 11 shows the diagram of a device making it possible to implement the invention. This device has a pipe-line architecture and comprises address generation means 10 and means 20 to determine contributions by interpolation.

The device also comprises weighting means 30 and adding means 40.

The device further comprises means 50 to store the data of the known space and means 60 and 70 to store the data of the unknown space. The address generation means receive the parameters V1, V2, V3 and V4 are adapted to calculate the ADR address to be determined. The calculation is made by incremental operators constituting the generator which on each cycle carries out an incremental type operation. The storage means 50 are addressed by the address generation means 10 and deliver the $(\gamma+1)$ consecutive values $V(ADR-\beta)$ to $V(ADR+\gamma)$ with $\beta+\gamma=\alpha$, $\beta$ and $\gamma$ being positive integers.

The interpolation means receive the $(\alpha+1)$ values $V(ADR-\beta)$ to $V(ADR+\gamma)$ and determine on each cycle the non-weighted contribution. The COEF coefficient used to carry out interpoloation is, for example, given by the address generator, this coefficient generally being the composed section of the address. The number is equal to 1 for one linear interpolation.

The weighting means 30 embody the product of the non-weighted contribution with the factor f. For this calculation, the weighting means receive the parameters V5, V6 and V7 and the data derived from the interpolator 20. In particular, for the 2D fan-shaped retroprojection operation, the parameters V6 and V7 may be derived from the address generator 10.

The adding means 40 make it possible to add the weighted contribution to the processed voxel (or pixel).

As represented on FIG. 11, the data outlet zone may be constituted by two memory benches 60 and 70 working in ping-pong.

Figure 11A:
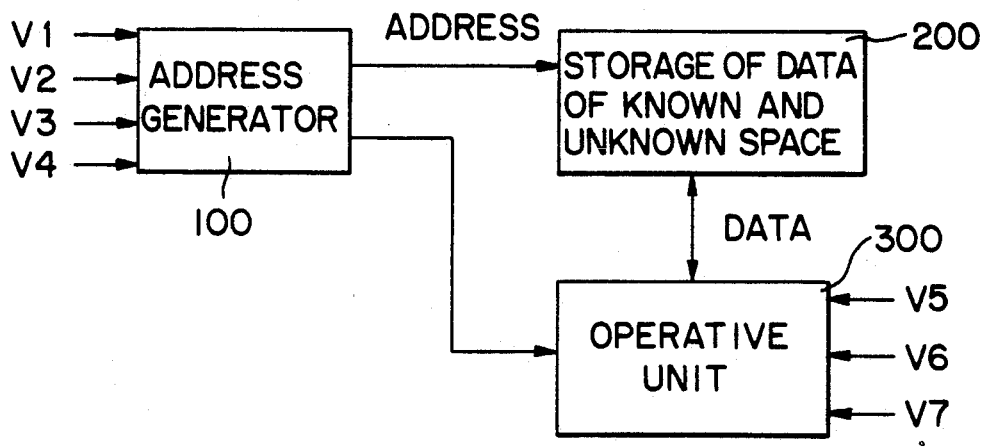
FIG. 11A represents the diagram of a device to implement the method of the invention according to a second embodiment.

FIG. 11A shows the diagram of a second device making it possible to implement the invention. The device comprises an address generator 100, means 200 for storing the data of the known space and of the unknown space. The device also comprises an operative unit 300 for the determination of the contribution, for weighting and for adding in accordance with the invention. The address generator 100 receives V1, V2, V3 and V4 and is adapted to provide the address ADR. The calculation is effected by incremental operators. The storage means 200 are addressed by the address generator 100 and deliver the $\alpha+1$ values $V(ADR-\beta)$ to $V(ADR+\gamma)$ with $\beta+\gamma=\alpha$, $\beta$ and $\gamma$ being positive integers.

The operative unit 300 receives the $\alpha+1$ values $V(ADR-\beta)$ to $V(ADR+\gamma)$ of the storage means 200, the interpolation coefficients relating to these values provided by the address generator 100 and receives V5, V6 and V7 for calculation of the weighting factor and along with the latter calculates the weighted contribution; it includes an adding device to add the weighted contribution to the corresponding value of the unknown space provided by the storage means 200 addressed by the address generator 100. This value is then returned to the storage means 200 and in particular the parameters V5, V6 and V7 may be derived from the address generator at the time of the 2D fan-shaped retroprojection.

The invention also concerns an application of the method for the reconstruction by synthesis and inversion of the RADON transform which makes use of four spaces.

Figure 12:
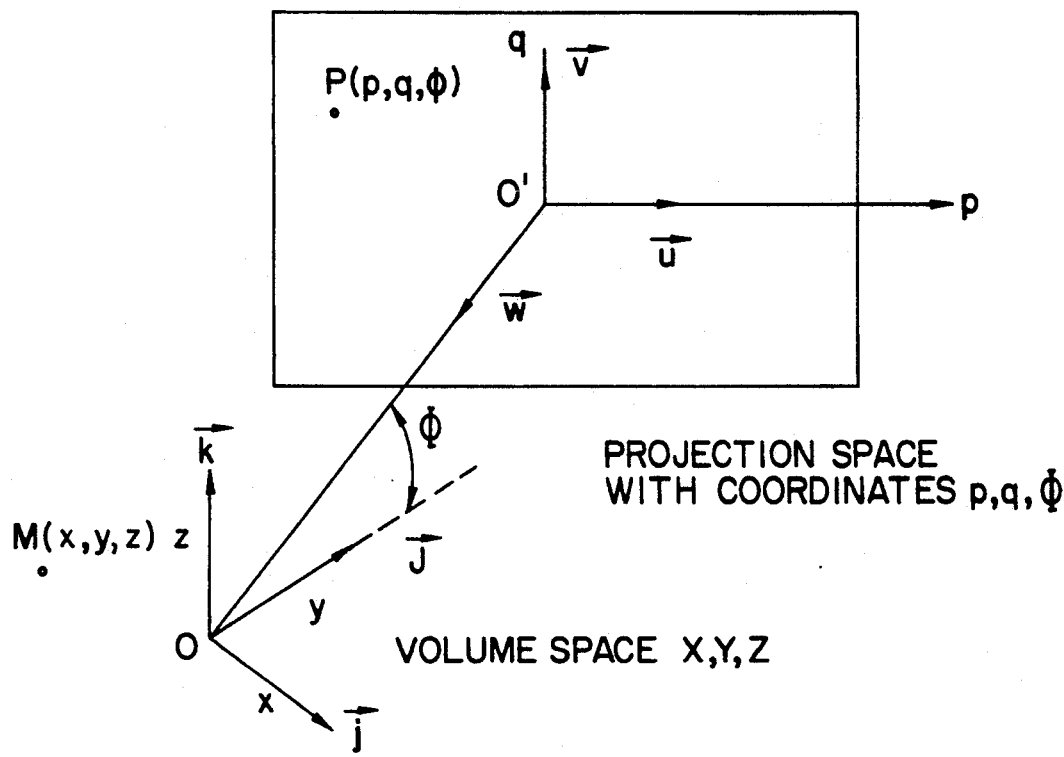
FIG. 12 shows the volume space for the reconstruction of the coordinates x, y, z and the known projection space of the coordinates p, q, $\phi$.

FIG. 12 shows the volume space to be reconstructed with the coordinates x, y and z and the known projection space with the coordinates p, q and $\phi$.

Figure 13:
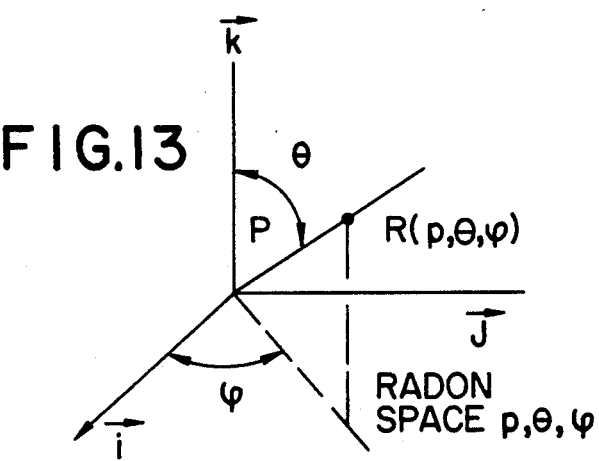
FIG. 13 shows the Radon space of the coordinates p, $\theta$, $\phi$ and the mark 0, $\bar{i}$, $\bar{j}$, $\bar{k}$ linked to the space of the volume to be reconstructed.

FIG. 13 shows the Radon space with the coordinates p, $\theta\phi$ and and the mark $\theta$, $\bar{i}$, $\bar{j}$ and $\bar{k}$ linked to the space of the volume to be reconstructed.

Figure 14:
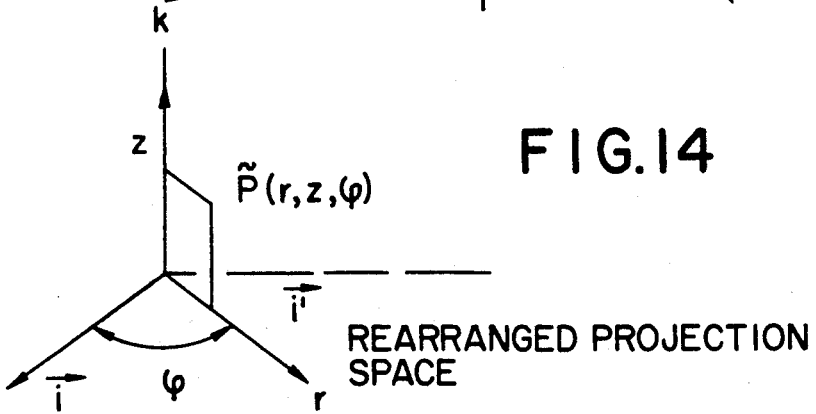
FIG. 14 shows the space of the rearranged projections with coordinates r, z, $\phi$.

FIG. 14 shows the space of the rearranged projections with the coordinates r, z and $\phi$.

Figure 15:
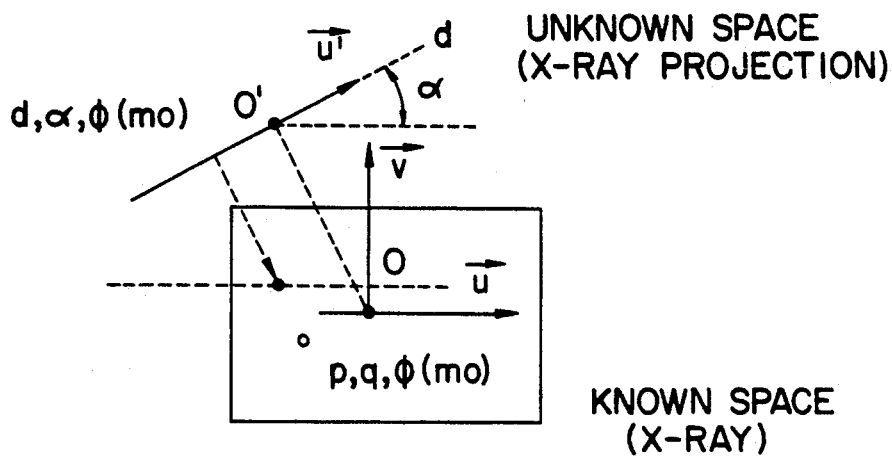
FIG. 15 shows a parallel reprojection of an X-ray plane.

The aim of this method is to pass from the known projection space to the space to be reconstructed, the latter therefore being unknown. This reconstruction is effected in 3 stages:

The first stage consists of a parallel geometry bidimensional reprojection of all the X-rays taken one at a time as images thus forming a known bidimensional image space; the unknown space associated with this image marked by $\phi(m_0)$ is the projection space with the coordinates d, $\alpha$, as shown on FIG. 15.

A series of bidimensional reprojections concerning all the X-rays makes it possible to obtain an intermediate data volume with the coordinates d, $\alpha$ and $\phi$. A resampling operation concerning this volume d, $\alpha$ and $\phi$ makes it possible to easily obtain the RADON space with the coordinates p, $\theta$ and $\phi$.

Figure 16:
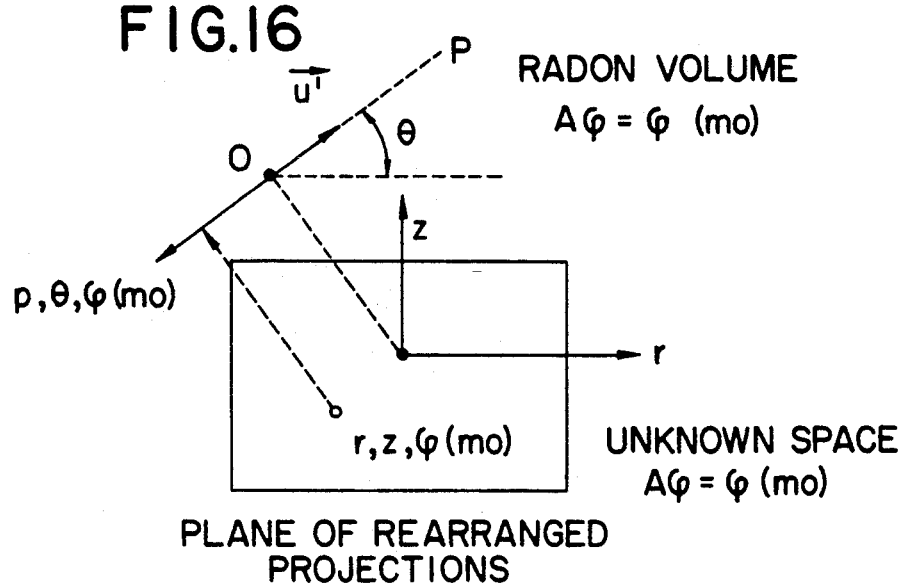
FIG. 16 shows a parallel retroprojection of one section of a volume.

After filtering of the data of the Radon space, the second (FIG. 16) stage is implemented and the known space is regarded as being the Radon space with the coordinates P, $\theta$ and $\phi$ adn the unknown space being the space of the rearranged projections with the coordinates r, z and $\phi$. A parallel geometry bidimensional retroprojection is carried out by taking as the known projection space each projection P, $\theta$ to $\phi=\phi$ ($m_0$)=constant and as the bidimensional space to be reconstructed the image with the coordinates r, z to $\phi=\phi$ ($m_0$) =constant. By thus repeating this operation for all the values of $\phi(m)$, the space of the rearranged projections with the coordinates r, z and is obtained.

Figure 17:
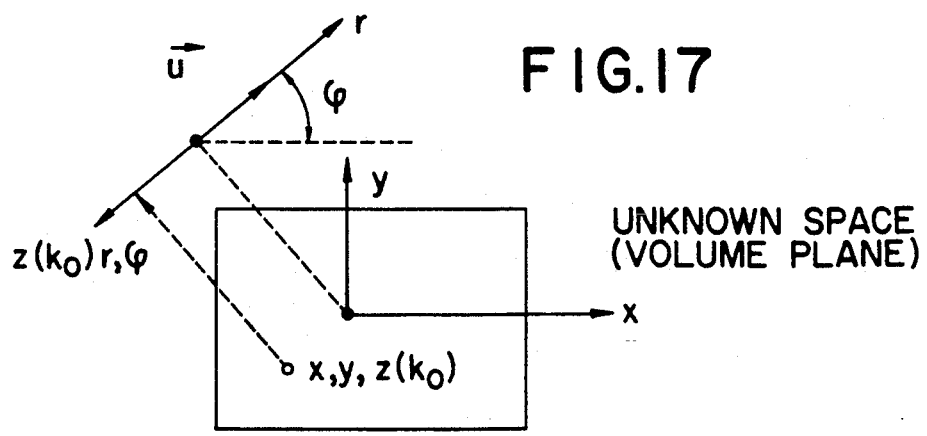
FIG. 17 shows a parallel retroprojection of one section of the rearranged retroprojection volume.

After standardization of the data of the rearranged projections r, z and $\phi$, the third stage (FIG. 17) is implemented and the known space is regarded as being the space of the rearranged projections with the coordinates r, z and $\phi$ and the unknown space being the volume space to be reconsturcted with the coordinates x, y and z. A parallel geometry bidimensional retroprojection is carried out by taking as the known projection each projection r, $\phi$ to $z=z(k_0)=$constant and asthe bidimensional space to be reconstructed the image with the coordinates x, y to $z=z(k_0)=$constant. By thus repeating this operation for all the values of z(k), the volume space to be reconstructed with the coordinates x, y and z is obtained.

The following table A makes it possible to synthesize the described application.

TABLE A

| Known space | | Sought space |
|---|---|---|
| X-ray projection p, q, $\theta(m_0)$ | 1st STAGE parallel geometry 2D reprojection | intermediate RADON d, $\alpha$, $\phi(m_0)$ |
| Intermediate RADON d, $\alpha$, $\theta$ | Resampling | Radon, p, $\theta$, $\rho$ |
| RADON p, $\theta$, $\rho(m_0)$ | 2nd STAGE parallel geometry 2D retro-projection | Rearranged projections r, z, $\rho(m_0)$ |
| Rearranged projections z, $\rho$, $z(k_0)$ | 3rd STAGE parallel geometry 2D retro-projection | Final volume sought x, y, $z(k_0)$ |

What is claimed is:

1. Method to determine data of an unknown discrete space from data of a known discrete space by an operation of reprojection or retroprojection, this operation being one of the steps allowing the reconstruction of a bidimensional or trimensional image of an analyzed body, the data of the known space coming from data of projections of the body obtained by means of a defined geometry acquisition device comprising a radiation source and a set of detectors, eventually processed by other steps of the process of the reconstruction, the data of each of the space being defined respectively by indices corresponding to the coordinates along three axes of the space, this determination of the unknown space being obtained by calculating the numerical value of each point (or data) of the unknown space on the basis of a determination of the contributions brought by the numerical values of the corresponding points (or data) of the known space, wherein said method consists of:

decomposing each space into one monodimensional set of points along given axes;

placing in correspondence successively for each monodimensional set of one of the spaces, the monodimensional sets of the other space;

realizing for each correspondence between one monodimensional set of points of the unknown space borne by an axis E of this space and one monodimensional set of points of the known space borne by an axis F of this space, one elementary iterative phase for each point of the monodimensional set of the unknown space, this elementary phase iteratively comprising for each point the following stages:

determining the index associated with the coordinate on the axis F of the corresponding point of the known space by taking the entire part ADR from the generalized expression $a_0(e)$ with:

$$a_0(e) = \frac{V1 + eV2}{V3 + eV4}$$

e being the iteration index corresponding to the coordinate on the axis E of the relevant point of the unknown space and V1, V2, V3 and V4 being constant parameters in the elementary phase, all these parameters being determined prior to this phase according to the selected acquisition geometry, the type of operation (reprojection or retroprojection) and the monodimensional sets placed in correspondence;

determining the contribution C made to the numerical value of the relevant point of the unknown space by interpolation on the numerical values of the corresponding point of the index ADR and possibly of adjacent points;

weighting this contribution by a factor f determined by the following equation:

$$f = \frac{V5}{(V6 + eV7)^2}$$

V5, V6 and V7 being constant parameters in the elementary phase, all these parameters being determined prior to this phase according to the selected acquisition geometry, the type of operation and the monodimensional units in question;

adding this weighted contribution to the numerical value of the relevant point of the unknown space determined during the preceding elementary phases having placed in correspondence the point of the unknown space with points of other known monodimensional spaces, all the contributions obtained at the end of the method to determine the unknown space constituting the final value of this point.

2. Method to determine a space from a known discrete space according to claim 1, wherein the elementary phase represents a parallel geometry retroprojection operation, the known space being a set of projection data indexed by l, m and n, m and n being fixed, the unknown space being the image space indexed by i, j and k (j and k) or (i and k) being fixed; the sought-after index $a_0$ (e) is either the index $l_0$ (j) when i and k and fixed, the axis E being indexed by j and the axis F by l, or the index $l_0$(i) when j and k are fixed, the axis E being indexed by i and the axis F by l, the following then being selected:

$V3=1$ $V4=0$ and for i fixed at $i_0$, k=0, m=0, n=$n_0$, $l_0$ (j) being sought $V1 = L_0 + i_0 \Delta I$ $V2 = \Delta J$ $e = j$ or for j fixed at $j_0$, k=0, m=0, n=$n_0$, $l_0$(i) being sought $V1 = L_0 + j_0 \Delta J$ $V2 = \Delta I$ $e = i$ the terms $L_0$, $\Delta I$, $\Delta J$ being predetermined, $l_0$ being a real whole number of the entire part 1.

3. Method to determine data of an unknown discrete space from data of a known discrete space according to claim 2, wherein a conical and parallel geometry in the case where the elementary phase represents a retroprojection and for a parallel geometry when this phase represents a reprojection, the weighting factor f is determined by taking:

$V7 = 0$ $V6 = 1$ and V5 is predetermined.

4. Method to determine a space from a known discrete space according to claim 1, wherein the elementary phase represents a parallel geometry reprojection phase, the known space being the image space indexed by l, m and n, (m and n) or (l and m) being fixed, the unknown space being all the projection data indexed i, j and k, j and k being fixed; the index $a_0$ (e) is the index $l_0$(i) or $n_0$(i), the axis E is then indexed by i and the axis F is indexed by l or n and the following is selected:

m fixed at 0, n at $n_0$, j at $j_0$, k at 0, $l_0$ (i) is sought $V3 = 1$ $V4 = 0$ $V1 = h_1(n_0, j_0)$ $V2 = \Delta L_1(j_0)$ $e = i$ or m fixed at 0, 1 at $l_0$, j at $j_0$, k at 0 and $n_0$ (i) is sought $V3 = 1$ $V4 = 0$ $V1 = h_2(l_0, j_0)$ $V2 = \Delta L_2(j_0)$ $e = i$ the terms $h_1$, $h_2$, $\Delta L_1$ and $\Delta L_2$ being predetermined and $n_0$ and $l_0$ are respectively real numbers of the entire number n and l.

5. Method to determine data of an unknown discrete space from data of a known discrete space according to claim 4, wherein a conical and parallel geometry in the case where the elementary phase represents a retroprojection and for a parallel geometry when this phase represents a reprojection, the weighting factor f is determined by taking:

$V7 = 0$ $V6 = V1$ and $V5$ is predetermined.

6. Method to determine a space from a known discrete space according to claim 1, wherein the elementary phase represents a fan-shaped geometry retroprojection operation with constant linear pitches, the known space being all the projection data indexed by l, m, n; m and n are fixed, the unknown space being the image space indexed by i, j, k (i and k) or (j and k) being fixed, the sought-after index $a_0$ (e) being either the index $l_0(i)$ or $l_0(j)$, the axis E being indexed by i or by j and the axis F by l, the following being selected:

k = 0, m = 0, n = $n_0$, j = $j_0$, $l_0$ (i) being sought, $V1 = h_3(j_0, n_0)$ $V2 = h_4(n_0)$ $V3 = h_5(j_0, n_0)$ $V4 = h_6(n_0)$ $e = i$ or: k = 0, m = 0, n = $n_0$, i = $i_0$, $l_0$ (j) being sought $V1 = h'_3(i_0, n_0)$ $V2 = h'_4(n_0)$ $V3 = h'_5(i_0, n_0)$ $V4 = h'_6(n_0)$ $e = j$.

the terms $h_3$, $h_4$, $h_5$, $h_6$, $h'_3$, $h'_4$, $h'_5$, $h'_6$ being predetermined and $l_0$ is a real number of the entire part l.

7. Method to determine data of an unknown discrete space from data of a known discrete space according to claim 6, wherein in the weighting stage for a fan-shaped geometry in the case of a retroprojection, the weighting factor f is determined by taking: V5 predetermined on the basis of the parameters of the acquisition device $V6 = V3$ $V7 = V4$.

8. Method to determine a space from a known discrete space according to claim 1, wherein the elementary phase represents a constant linear pitch fan-shaped geometry reprojection operation, the known space being the image space indexed by l, m, n; (m and n) or (l and m) being fixed, the unknown space being all the projection data indexed by i, j, k, j and k being fixed, the sought-after index $a_0$ (e) being the index $l_0$ (i) or $n_0$ (i), the axis E being indexed by i and the axis F by l or n and the following is then selected:

m fixed at 0, n at $n_0$, j at $j_0$, k at 0, $l_0$ (i) being sought, $V1 = h_7(n_0, j_0)$ $V2 = h_8(n_0, j_0)$ $V3 = h_9(j_0)$ $V4 = h_{10}(j_0)$ $e = i$ or = m fixed at 0, 1 at $l_0$, j at $j_0$, k at 0, $n_0$ (i) being sought, $V1 = h'_7(l_0, j_0)$ $V2 = h'_8(l_0, j_0)$ $V3 = h'_9(j_0)$ $V3: h'_{10}(j_0)$ $e = i$ the terms $h_7$, $h_8$, $h_9$, $h_{10}$, $h'_7$, $h'_8$, $h'_9$, $h'_{10}$, being predetermined and $n_0$, $l_0$ respectively being real numbers of the entire part n and l.

9. Method to determine data of an unknown discrete space from data of a known discrete space according to claim 8, wherein in the weighting stage for a fan-shaped and conical geometry in the case of reprojection, the weighting factor f is determined by taking:

$V5 = 1$ $V6 = 1$ $V7 = 0$.

10. Method to determine a space from a known discrete space according to claim 1, wherein the elementary phase represents a conical geometry retroprojection operation, the unknown space being an image space indexed by i, j, k (j and k being fixed), the known space being the projection space indexed by l, m, n (n being fixed and m fixed since depending on j and k), the sought-after index $a_0$ (e) is the index $l_0$ (i), the axis E is indexed by i and the axis F by l, and the following is then selected:

$V3 = 1$ $V4 = 0$

-continued $$V1 = \frac{Z_0 C - Q_0}{\Delta Q}$$

$$V2 = \frac{C \cdot \Delta Z}{\Delta Q}$$

the terms $Z_0$, $C$, $Q_0$, $\Delta Z$ and $\Delta Q$ being predetermined and $l_0$ being a real number whose entire part is l.

11. Method to determine data of an unknown discrete space from data of a known discrete space according to claim 10, wherein a conical and parallel geometry in the case where the elementary phase represents a retroprojection and for a parallel geometry when this phase represents a reprojection, the weighting factor f is determined by taking:

$V7 = 0$ $V6 = V1$ and $V5$ is predetermined.

12. Method to determine data of an unknown discrete space from data of a known discrete space according to claim 1, wherein the elementary phase represents a conical geometry reprojection, the unknown space being the projection space indexed by i, j, k (j and k being fixed) and the known space being the image space indexed by l, m, n (m being fixed, n being fixed since dependent on j and k); the sought-after index $a_0(e)$ is the index l (i), the axis E is indexed by i and the axis F by l and the following is then selected:

$V3 = 1$ $V4 = 0$ $$V1 = \frac{Q_0 C - Z_0}{\Delta Z}$$

$$V2 = \frac{C \Delta Q}{\Delta Z}$$

the terms $Z_0$, $Q_0$, c, $\Delta Z$ and $\Delta Q$ being predetermined and $l_0$ being a real number whose entire part is l.

13. Method to determine data of an unknown discrete space from data of a known discrete space according to claim 12, wherein in the weighting stage for a fan-shaped and conical geometry in the case of reprojection, the weighting factor f is determined by taking:

$V5 = 1$ $V6 = 1$ $V7 = 0$.

14. Application of the method according to claim 1 for the reconstruction of images by synthesis and inversion of the RADON transform.

15. Application of the method according to claim 14, wherein the reconstruction consists of three stages:
a first stage consisting of one parallel geometry bidimensional reprojection making it possible to obtain a RADON transform;
a second stage consisting of a parallel geometry bidimensional retroprojection making it possible to obtain rearranged projections;
a third stage consisting of a parallel geometry bidimensional retroprojection making it possible to obtain the final sought-after volume.

16. Device for obtaining data of an unknown discrete space from data of a known discrete space comprising:
a defined geometry acquisition device having a radiation source and a set of detectors, the data of each of the spaces being defined respectively by indices corresponding to the coordinates along three axes of the space, the coordinate on an axis F of a corresponding point of the known space being determined by taking the entire part of the address ADR from the generalized expression where:

$$a_o(e) = \frac{V1 + eV2}{V3 + eV4}$$

e being the iteration index corresponding to the coordinate on the axis E of the relevant point of the unknown space and V1, V2, V3 and V4 being constant parameters in the elementary phase,
address generation means receiving the parameters V1 to V4 delivering the address ADR which is the entire part of $a_0(e)$;
means to store the numerical values of the points of the known space addressed by the generation means delivering all the $(\alpha+1)$ numerical values of the points of the known space of $V(ADR)-\beta)$ to $V(ADR+\delta)$ ($\beta$ and $\delta$ being positive integers; $\beta+\delta=\alpha$ corresponding to the index ADR being the order of interpolation;
interpolation means receiving the numerical values $V(ADR-\beta)$ to $V(ADR+\delta)$ contained in the memory and addressable by the index ADR and determining at the end of interpolation a contribution non-weighted to the numerical value of each corresponding point of the unknown space;
weighting means receiving each non-weighted contribution and the parameters V5, V6 and V7 to deliver each weighted contribution, V5, V6 and V7 being constant parameters in the elementary phase;
adding means to add to the numerical value of the relevant point of the unknown space the weighted contribution relating to this point in question; and
storage means containing the current value.

17. Device for obtaining data of an unknown discrete space from data of a known discrete space comprising:
a defined geometry acquisition device having a radiation source and a set of detectors, the data of each of the spaces being defined respectively by indices corresponding to the coordinates along three axes of the space, the coordinate on an axis F of a corresponding point of the known space being determined by taking the entire part of the address ADR from the generalized expression where:

$$a_o(e) = \frac{V1 + eV2}{V3 + eV4}$$

e being the iteration index corresponding to the coordinate on the axis E of the relevant point of the unknown space and V1, V2, V3 and V4 being constant parameters in the elementary phase,
address generation means receiving the parameters V1 to V4 delivering the address ADR which is the entire part of $a_o(e)$;
means to store the numerical values of the points of the known space addressed by the address generation means delivering all the data $V(ADR-\beta)$ to $V(ADR+\delta)$ (with $\beta+\delta=\alpha$, $\beta$ and $\delta$ being positive integers) corresponding to the index ADR, being the order of interpolation and delivering the numerical values of the data of the unknown space addressed by the address generation means and receiving the numerical values of the data of the unknown space after processing;

an operative interpolation, weighting and adding unit determining the non-weighted contribution, the weighted contribution and determining at the end the numerical value of the current point by adding the weighted contribution to the value preceding this point.

* * * * *